United States Patent [19]
Reed

[11] 4,457,003
[45] Jun. 26, 1984

[54] TIME REFERENCE TRACKING LOOP FOR FREQUENCY HOPPING SYSTEMS

[75] Inventor: Francis K. Reed, Scottsdale, Ariz.

[73] Assignee: Motorola Inc., Schaumburg, Ill.

[21] Appl. No.: 390,497

[22] Filed: Jun. 21, 1982

[51] Int. Cl.³ .......................... H04K 1/00; H04B 1/10
[52] U.S. Cl. .................................... 375/1; 375/34
[58] Field of Search ..................... 375/1, 2, 115, 118, 375/119, 120, 34; 370/107; 343/5 PN; 455/26; 371/42, 47

[56] References Cited
U.S. PATENT DOCUMENTS

| | | |
|---|---|---|
| 4,041,391 | 8/1977 | Deerkoski .......................... 375/1 |
| 4,351,064 | 9/1982 | Ewanus .............................. 375/1 |
| 4,361,891 | 11/1982 | Lobenstein et al. ................ 375/1 |

Primary Examiner—Robert L. Griffin
Assistant Examiner—Stephen Chin
Attorney, Agent, or Firm—Eugene A. Parsons

[57] ABSTRACT

A system for using phase modulated information carried by a pilot tone generated in the transmitter of a frequency hopping communications system to synchronize the receivers dehop schedule generator with the transmitter's hop schedule generator.

2 Claims, 5 Drawing Figures

TIME REFERENCE TRACKING LOOP FOR FREQUENCY HOPPING SYSTEMS

FIELD OF THE INVENTION

The system of the invention relates to a new method of synchronizing a dehop schedule generator in the receiver with the hop schedule generator in the transmitter of a communications system. Phase modulation on the received pilot tone is utilized to facilitate synchronization.

BACKGROUND OF THE INVENTION

Frequency hopping of both transmitters and receivers in communication systems is utilized for several reasons including protection against interference and spreading of the spectrum of the transmitted signal to minimize interference with other users of the radio frequency spectrum. The proper operation of the frequency hopping system requires that the timing of the receiver be closely synchronized to the transmitter so that the receiver can successfully follow the frequency shift of the transmitter. The receiver must switch its frequency at the proper instant corresponding to the switched received frequency in order to provide high quality demodulated signals. The usual manner in which the receiver synchronizes itself in time with the received signal utilizes a transmitted pilot tone to provide frequency and phase reference. The utilization of such a pilot tone to maintain timing reference is subject to phase drift in the various systems components between the transmitter and the receiver timing recovery circuits. In prior art systems high stability components such as ovenized filters are used to minimize drift to overcome these problems. These filters and other such components tend to be large and expensive.

SUMMARY OF THE INVENTION

The present invention is based on the discovery that the recovered pilot tone in the receiver is phase modulated with a signal that is correlated with the output of the transmitter hop schedule generator. The frequency hop synthesizer must maintain phase continuity as its input frequency is switched. FIG. 1A graphically illustrates the problem. $\phi_1(t)$ shows the phase of the transmitted signal pilot tone as the signal is hopped from one frequency to another. The frequency before and after the hop is proportional to the slope of straight line portions 10 and 14, respectively. Similarly, $\phi_2(t)$ shows the phase of the recovered signal pilot tone. The transmitted signal $\phi_1(t)$ has a break point between straight line portions 10, 14. This change in slope is caused by the transmitter hop schedule generator which has a hopping interval, T. The corresponding break point in curve 12, 16 of the recovered signal, $\phi_2(t)$, in the receiver is displaced by a time $\tau$, which represents error in the dehop schedule generator synchronization in the receiver. FIG. 1B illustrates the difference in phase between $\phi_1(t)$ and $\phi_2(t)$ and the step difference is shown as $\Delta\phi$ at 18. Since, generally;

$$\omega = d\phi(t)/dt \qquad (1)$$

the phase step difference is given by:

$$\Delta\phi = [\omega_i - \omega_{i-1}]\tau \qquad (2)$$

at the end of the time period $\tau$. An error signal which is a function of this difference may be used to correct the phase delay error and assure coherent receiver dehopping.

It is, therefore, an object of the invention to provide dehopping synchronization in a receiver by taking advantage of the phase modulation on a recovered pilot signal which is correlated with the hop schedule generator in the transmitter.

This and other objects of the invention shall become more apparent upon study of the Detailed Description of the Invention, below, together with the drawings in which.

DETAILED DESCRIPTION OF THE INVENTION

Figure 2A:
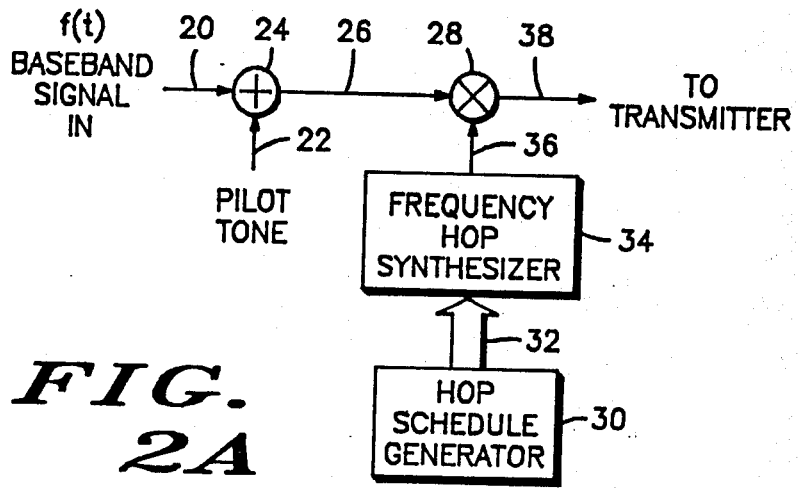
FIGS. 2A and B are block diagrams of a preferred embodiment of the transmitter and receiver of the invention.

Referring to FIG. 2A, baseband and pilot tone signals are inputted at 20, 22 respectively, to adder 24. The pilot tone has an angular frequency of $\omega_p$. Output 26 of adder 24 is a signal having a component $e^{j\omega_p t}$. This signal on line 26 is presented at one input of mixer 28. Hop Schedule Generator 30 generates control signals $\omega(t)$ on bus 32 which are sent to and control frequency hop synthesizer 34. Synthesizer 34 puts out a pseudo-randomly varying frequency signal $e^{j\phi_1(t)}$ on line 36 as a result of the control signals on line 32:

$$\omega(t) = \omega_i \text{ (constant)} \qquad (3)$$

where:

$iT < t \leq (i+1)T$
$T = $ Frequency Hop Interval $$\phi_1(t) = \int_0^t \omega(t)dt \qquad (4)$$

so that there are no phase discontinuities. The $e^{j\phi_1(t)}$ signal on line 36 is mixed with the $e^{j\omega_p t}$ signal on line 26 in mixer 28 to produce:

$$e^{j[\omega_p t + \phi_1(t)]} \qquad (5)$$

at the output to the transmitter (not shown) on line 38.

Figure 2B:
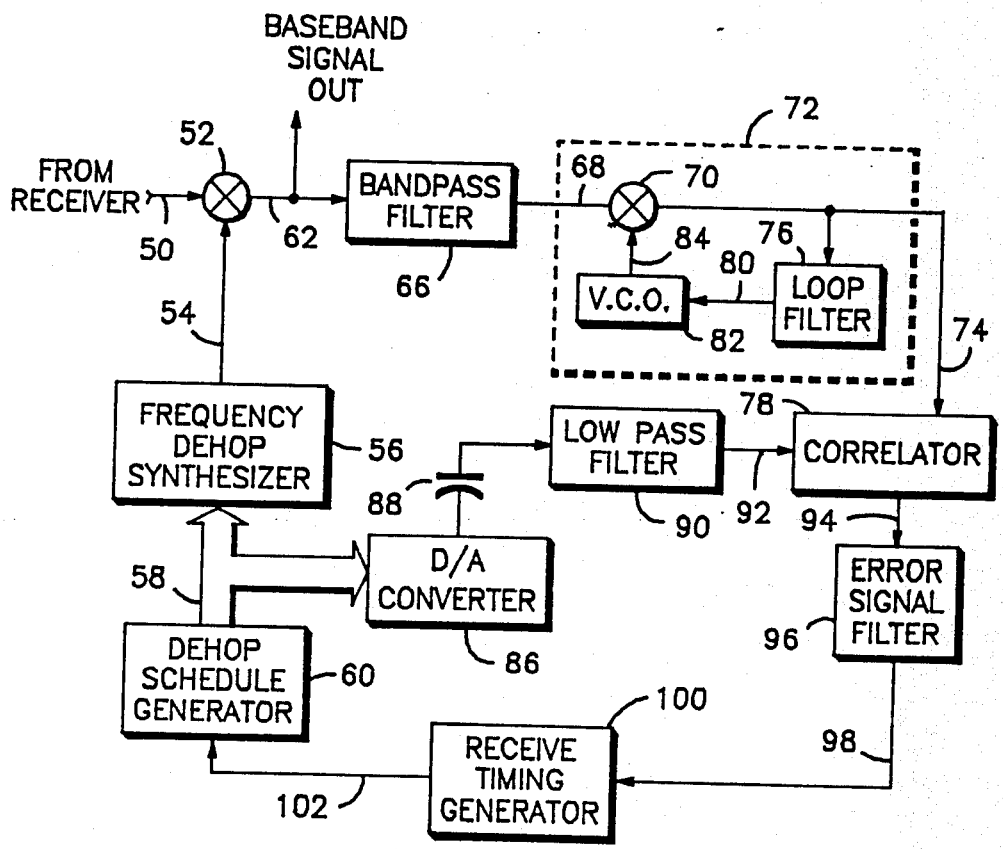

Referring now to FIG. 2B, it will be seen that the signal described in equation (5), supra, is recovered in the receiver (not shown) and is available on line 50. This signal on line 50 is fed to mixer 52 where it is mixed with a signal $e^{-j\phi_2(t)}$ on line 54 from dehop frequency synthesizer 56. Dehop frequency synthesizer is driven via bus 58 from dehop schedule generator 60. Ideally, dehop schedule generator 60 would be in perfect synchronism with the received signal so that the signal delivered from frequency dehop synthesizer 56 would, at all times, be at precisely the same frequency as the signal on line 36 (of the transmitter, FIG. 2A) used to up-convert the corresponding baseband signal at the transmitter. This would provide a precise reproduction of the baseband signal in the transmitter on line 62 at the output of mixer 52. However, in the practical case, dehop schedule generator 60 must be controlled by an error signal to provide the desired result. Otherwise, the timing of dehop schedule generator 60 is not precise enough and the baseband signal, as recovered by the receiver at line 62, contains added noise due to imperfect synchronization of hop schedule generator 30 (FIG. 2A) and dehop schedule generator 60.

Figure 1A:
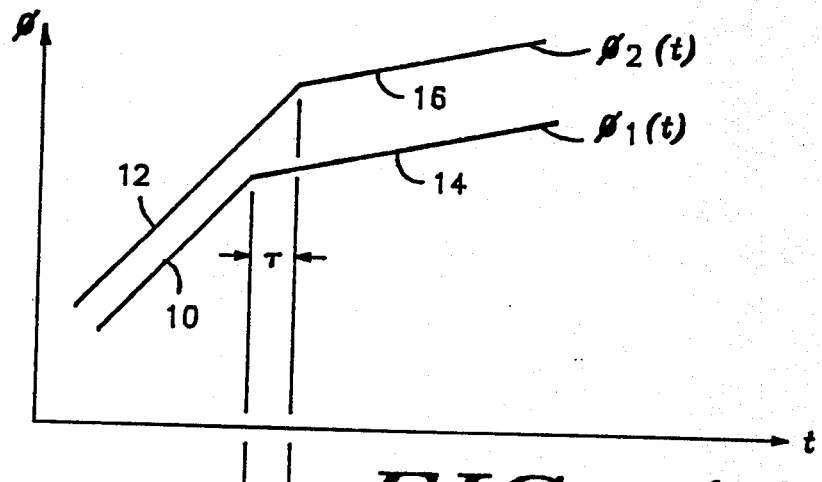
FIG. 1A is a graph illustrative of the time delay between transmitted and recovered signals.
Figure 1B:
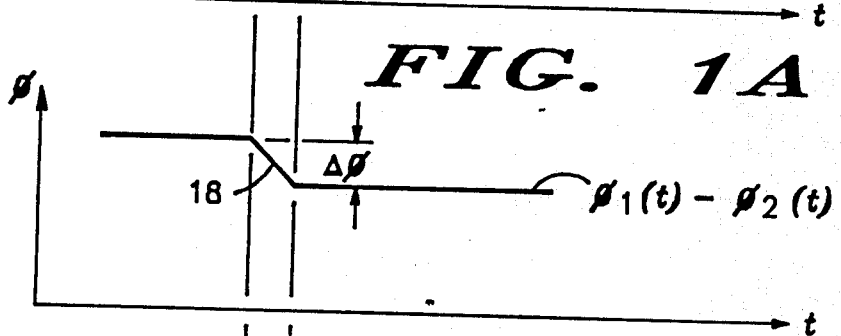
FIG. 1B is a graph of the phase difference between transmitted and recovered signals.

The signal at 62 is fed to band pass filter 66 which is used to strip off the $\omega_p(t)$ component of the receiver input signal at line 68 in the form:

$$b(t) = R_e\{e^{j\omega_p t + \phi_1(t) - \phi_2(t)}\} \tag{6}$$

where Re denotes the real part of the complex signal. The $$\phi_1(t) - \phi_2(t) \tag{7}$$

portion of the signal of equation (6) represents a phase modulation of $\omega_p$ (the pilot tone) which is used to precisely recover hop schedule generator 30 (FIG. 2A) timing in the receiver of the invention. (See FIGS. 1A and 1B for clarification of the term.) The b(t) signal of equation (6) is fed to one input of phase detector 70 in pilot tone tracking phase locked loop 72. The output of phase detector 70 on line 74 is of the form:

$$c(t) = G[\omega(t) - \bar{\omega}]\tau = G(\phi_1 - \phi_2) \tag{8}$$

where
G = phase detector 70 gain (volts/radian) and
$\bar{\omega}$ = the average angular frequency.

The signal on line 74 is then fed to loop filter 76 and to correlator 78. Loop filter 76 is a low pass filter with a band pass chosen (as will be well understood by one of skill in this art) to suit system needs.

The output of loop filter 76 is fed via line 80 to voltage controlled oscillator (VCO) 82 as an error signal for controlling the output frequency $\bar{\omega}$, on line 84, from VCO 82. The output signal on line 84 is fed to a second input of phase detector 70, thereby completing phase locked loop 72.

The c(t) signal (equation (8)) on line 74 is also fed to correlator 78, as before mentioned. The digital signal $\omega(t)$ on bus 58 (from dehop schedule generator 60) is also fed to D/A (digital to analog) converter 86 where it is converted to an analog signal. This signal is fed via blocking capacitor 88 to LPF (low pass filter) 90. The output of LPF 90 is of the form:

$$f(t) = \omega(t) - \bar{\omega} \tag{9}$$

and is fed to a second input of correlator 78 via line 92. It is important to note that BPF 66 and LPF 90 must have approximately matched group delay characteristics for optimum performance of the system of the invention. The output of correlator 78 on line 94 has the form:

$$g(t) = c(t) f(t) = G[\omega(t) - \bar{\omega}]^2 \tau \tag{10}$$

and is fed to error signal filter 96 which averages the g(t) signal (equation 10) to the form:

$$e(t) = G\overline{[\omega(t) - \bar{\omega}]^2}\tau \tag{11}$$

(where the long superscript bar indicates averaging). This signal (equation 10) is then fed to receive timing generator 100.

Thus, it may be seen that the recovered pilot tone is applied to phase locked discriminator 72 which produces an output proportional to the phase modulation carried by the pilot tone (equation 8), the output of the discriminator is correlated in correlator 78 with a waveform on line 92 which is of the same shape as the transmitted and received frequency signal. Correlator 78 then produces an output on line 94 (equation (10)) which is proportional to the timing error $\tau$. This output is utilized in the invention to provide an error to receiver timing generator 100 which tends to reduce the system timing error to zero.

Figure 1C:
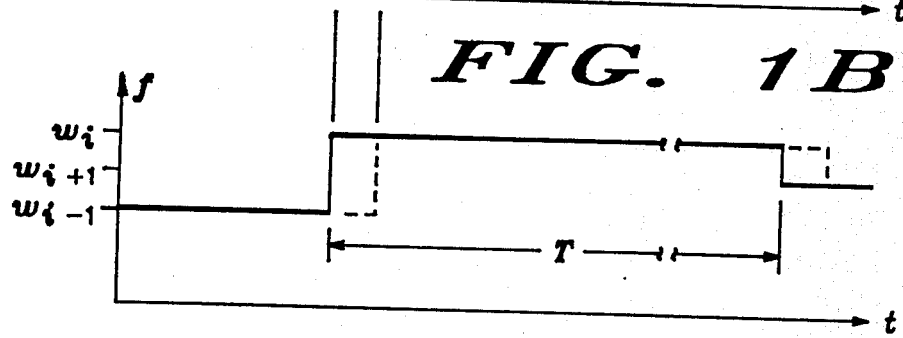
FIG. 1C is a graph showing the time relationship between the hop signal (solid line) and dehop signal (broken line)

The equations set forth, supra, are valid providing that the bandwidth of BPF 66 and LPF 90 are much wider than the spectrum of the frequency function $\omega(t)$. This does not mean that the bandwidth of the filters is wider than the range of frequency hopping, but that the bandwidth is wider than the input to frequency hopped synthesizer 34 from hop schedule generator 30 (see FIG. 2A). The necessary condition is satisfied if the bandwidth of filters 66 and 90 is much greater than the reciprocal of the time interval, T, of the frequency hopped. (See FIG. 1C.)

The invention would still function properly in the case where these bandwidths were considerably less than spectrum width of $\omega(t)$. If the band pass filter 66 is narrower than the spectrum of $\omega(t)$, the energy within the filter bandwidth about the pilot tone frequency will still be passed through to phase locked discriminator 72. The function of low pass filter 90 is to match the delay characteristics of band pass filter 66, such that signal f(t) from low pass filter 90 is a similarly filtered version of the signal $\omega(t)$. The correlation between signals c(t) and f(t) would still exist except that the signal power would be reduced because of the filtering. Correlator 78, however, would still function and produce an output which would be proportional to the timing error $\tau$.

While the invention has been particularly shown and described with reference to a preferred embodiment thereof, it will be understood by those skilled in the art that various other modifications and changes may be made to the present invention from the principles of the invention described above without departing from the spirit and scope thereof, as encompassed in the accompanying claims. Therefore, it is intended in the appended claims to cover all such equivalent variations as come within the scope of the invention as described.

I claim:

1. A method for dehopping a hopped frequency in a communications system comprising the steps of:
   supplying a pilot tone in a transmitter of the communications system which carries a frequency modulation that is correlated with an output of a hop schedule generator of said transmitter;
   recovering said pilot tone in a receiver of the Communications system;
   detecting a phase modulation of said recovered pilot tone; and
   correlating said phase modulation of said recovered pilot tone with an output of a dehop schedule generator to produce an error signal that is proportional to a system timing error; and
   applying said error signal to said dehop schedule generator to correct said system timing error toward zero.

2. A communications system having a transmitter for transmitting a frequency hopped signal and a receiver for receiving and frequency dehopping the signal comprising:

means for generating a pilot tone modulated on a carrier of the transmitter, and carrier being frequency modulated by a signal having a correlation with an output of a hop schedule generator of the transmitter;

means for sending said modulated carrier to the receiver;

means for recovering said modulated pilot tone in the receiver;

means for detecting a phase modulation from said recovered pilot tone;

means for correlating said detected phase modulation with an output of a dehop schedule generator in the receiver to produce an error signal, said error signal being proportional to a timing error between said hop schedule generator and said dehop schedule generator; and means for applying said error signal to said dehop schedule generator for correcting said timing error toward zero.

* * * * *